US006342188B1

(12) United States Patent
Pearcey et al.

(10) Patent No.: US 6,342,188 B1
(45) Date of Patent: Jan. 29, 2002

(54) RADIATION SOURCE MODULE AND CLEANING APPARATUS THEREFOR

(75) Inventors: Richard Pearcey; Nicholas Helmut Hesse; Christopher Jeffery Sheculski, all of London (CA)

(73) Assignee: Trojan Technologies, Inc. (CA)

( * ) Notice: Subject to any disclaimer, the term of this patent is extended or adjusted under 35 U.S.C. 154(b) by 0 days.

(21) Appl. No.: 09/185,813

(22) Filed: Nov. 3, 1998

(51) Int. Cl.[7] ............................................. B01J 19/08
(52) U.S. Cl. ........................ 422/186.3; 422/186.3; 204/660; 204/671; 210/710
(58) Field of Search .................... 422/186.6, 186.3, 422/210; 250/435; 204/660, 671; 210/710

(56) References Cited

U.S. PATENT DOCUMENTS

| | | | |
|---|---|---|---|
| 3,779,401 A | * 12/1973 | Carroll | 92/13.7 |
| 3,808,865 A | * 5/1974 | Wagner | 72/269 |
| 4,367,410 A | 1/1983 | Wood | 250/431 |
| 4,488,477 A | * 12/1984 | Miyamoto | 92/85 R |
| 4,744,287 A | * 5/1988 | Miyamoto | 198/750.11 |
| 5,418,370 A | 5/1995 | Maarschalkerweerd | 250/431 |
| 5,504,335 A | * 4/1996 | Maarschalkerweerd | 250/435 |
| 5,590,390 A | * 12/1996 | Maarschalkerweerd | 422/186.3 |
| 5,982,053 A | * 11/1999 | Chitayat | 310/12 |

FOREIGN PATENT DOCUMENTS

| | | |
|---|---|---|
| DE | 20 03 989 | 8/1971 |
| EP | 0 467 465 | 1/1992 |
| JP | 1-268889 | * 10/1989 |
| JP | 10249335 | 9/1998 |

* cited by examiner

*Primary Examiner*—Kathryn Gorgos
*Assistant Examiner*—Thao Tran
(74) *Attorney, Agent, or Firm*—Katten Muchin Zavis

(57) ABSTRACT

A cleaning apparatus for a radiation source assembly in a fluid treatment system is described. The cleaning system comprises: a cleaning sleeve comprising a cleaning ring for engagement with a portion of the exterior of the radiation source assembly; a slidable member magnetically coupled to the cleaning sleeve, the slidable member being disposed on and slidable with respect to a rodless cylinder; and motive means to translate the slidable member along the rodless cylinder whereby the cleaning sleeve is translated over the exterior of the radiation source assembly. A radiation source module comprising the cleaning apparatus is also disclosed. The radiation source module is particularly useful for ultraviolet radiation of wastewater while having the advantages of in situ cleaning of the radiation source as when it becomes fouled.

47 Claims, 9 Drawing Sheets

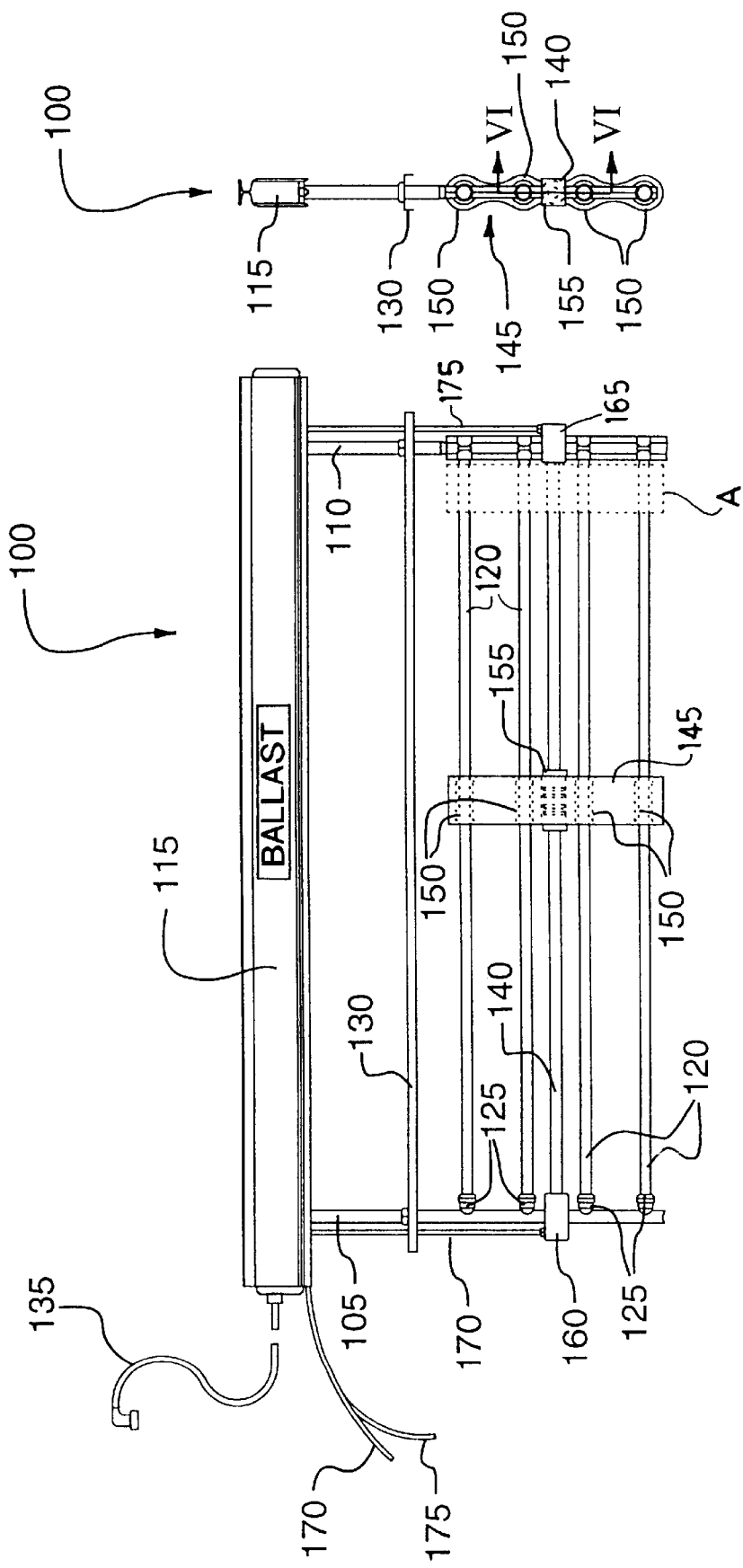

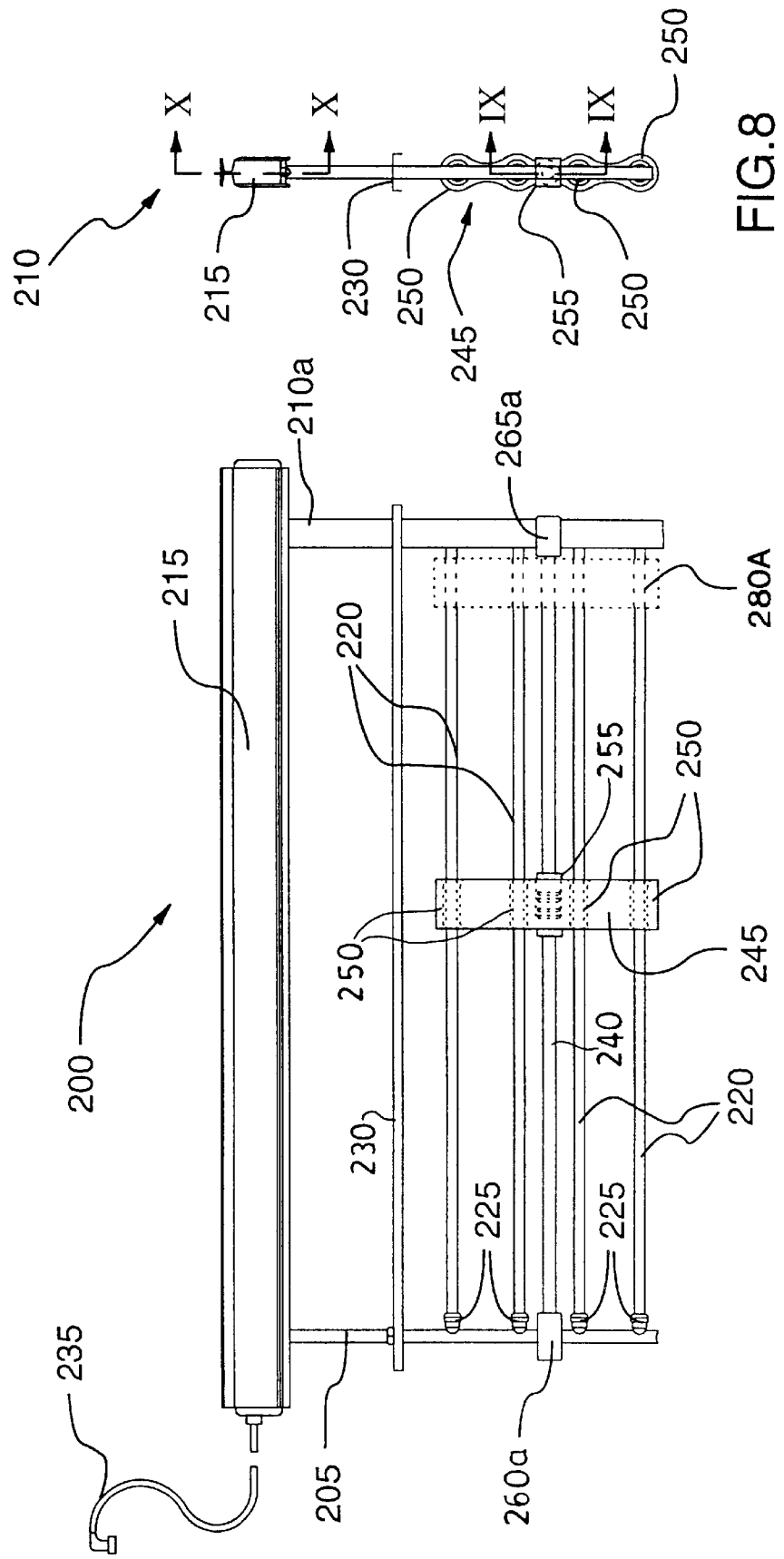

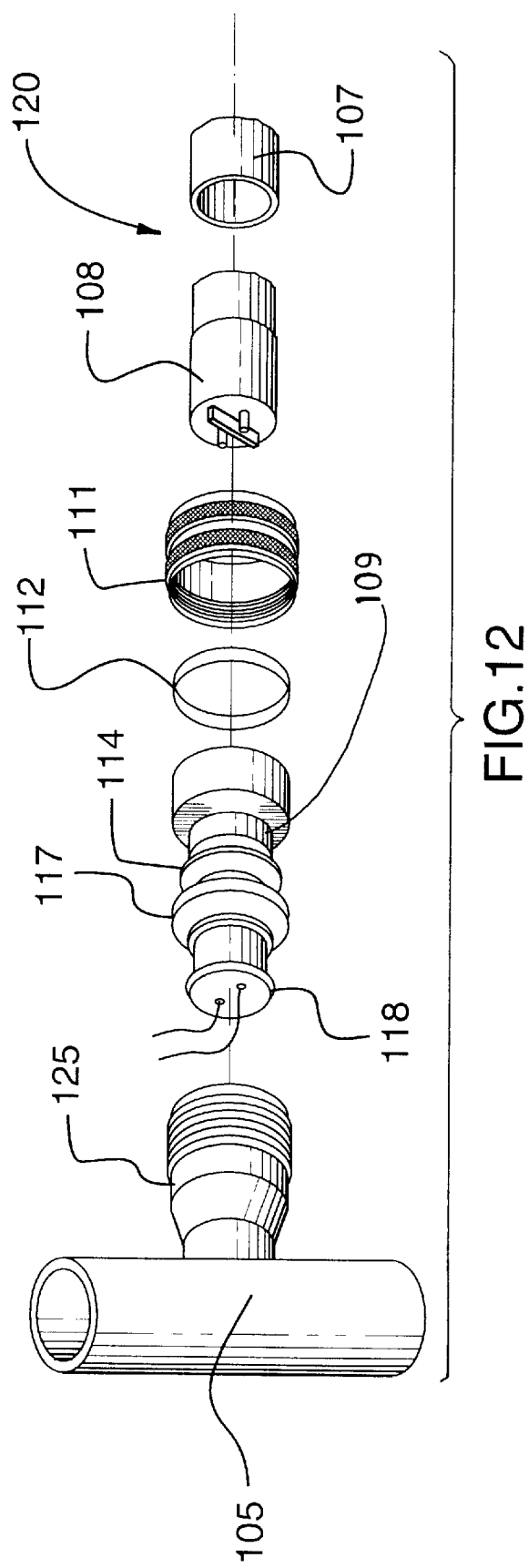

RADIATION SOURCE MODULE AND CLEANING APPARATUS THEREFOR

BACKGROUND OF THE INVENTION

1. Field of the Invention

In one of its aspects, the present invention relates to a cleaning apparatus for use in a fluid treatment module. In another of its aspects, the present invention relates to a radiation source module comprising the cleaning system.

2. Description of the Prior Art

Fluid treatment systems are known generally in the art.

For example, U.S. Pat. Nos. 4,482,809, 4,872,980 and 5,006,244 (all in the name of Maarschalkerweerd and all assigned to the assignee of the present invention and hereinafter referred to as the Maarschalkerweerd #1 Patents), the contents of each of which are hereby incorporated by reference, all describe gravity fed fluid treatment systems which employ ultraviolet (UV) radiation.

Such systems include an array of UV lamp frames which include several UV lamps each of which are mounted within sleeves which extend between and are supported by a pair of legs which are attached to a cross-piece. The so-supported sleeves (containing the UV lamps) are immersed into a fluid to be treated which is then irradiated as required. The amount of radiation to which the fluid is exposed is determined by the proximity of the fluid to the lamps, the output wattage of the lamps and the fluid's flow rate past the lamps. Typically, one or more UV sensors may be employed to monitor the UV output of the lamps and the fluid level is typically controlled, to some extent, downstream of the treatment device by means of level gates or the like.

However, disadvantages exist with the above-described systems. Depending upon the quality of the fluid which is being treated, the sleeves surrounding the UV lamps periodically become fouled with foreign materials, inhibiting their ability to transmit UV radiation to the fluid. For a given installation, the occurrence of such fouling may be determined from historical operating data or by measurements from the UV sensors. Once fouling has reached a certain point, the sleeves must be cleaned to remove the fouling materials and optimize system performance.

If the UV lamp modules are employed in an open, channel-like system (e.g., such as the one described and illustrated in Maarschalkerweerd #1 Patents), one or more of the modules may be removed while the system continues to operate, and the removed frames may be immersed in a bath of suitable cleaning solution (e.g., a mild acid) which may be air-agitated to remove fouling materials. Of course, this necessitates the provision of surplus or redundant sources of UV radiation (usually by including extra UV lamp modules) to ensure adequate irradiation of the fluid being treated while one or more of the frames has been removed for cleaning. This required surplus UV capacity adds to the capital expense of installing the treatment system. Further, a cleaning vessel for receiving the UV lamp modules must also be provided and maintained. Depending on the number of modules which must be serviced for cleaning at one time and the frequency at which they require cleaning, this can also significantly add to the expense of operating and maintaining the treatment system. Furthermore, this cleaning regimen necessitates relatively high labor costs to attend to the required removal/re-installation of modules and removal/re-filling of cleaning solution in the cleaning vessel. Still further, such handling of the modules results in an increased risk of damage to or breakage of the lamps in the module.

If the frames are in a closed system (e.g., such as the treatment chamber described in U.S. Pat. No. 5,504,335 (in the name of Maarschalkerweerd and assigned to the assignee of the present invention), the contents of which are hereby incorporated by reference), removal of the frames from the fluid for cleaning is usually impractical. In this case, the sleeves must be cleaned by suspending treatment of the fluid, shutting inlet and outlet valves to the treatment enclosure and filling the entire treatment enclosure with the cleaning solution and air-agitating the fluid to remove the fouling materials. Cleaning such closed systems suffers from the disadvantages that the treatment system must be stopped while cleaning proceeds and that a large quantity of cleaning solution must be employed to fill the treatment enclosure. An additional problem exists in that handling large quantities of cleaning fluid is hazardous and disposing of large quantities of used cleaning fluid is difficult and/or expensive. Of course open flow systems suffer from these two problems, albeit to a lesser degree.

Indeed, it is the belief of the present inventors that, once installed, one of the largest maintenance costs associated with prior art fluid treatment systems is often the cost of cleaning the sleeves about the radiation sources.

U.S. Pat. Nos. 5,418,370, 5,539,210 and 5,590,390 (all in the name of Maarschalkerweerd and all assigned to the assignee of the present invention and hereinafter referred to as the Maarschalkerweerd #2 Patents), the contents of each of which are hereby incorporated by reference, all describe an improved cleaning system, particularly advantageous for use in gravity fed fluid treatment systems which employ UV radiation. Generally, the cleaning system comprises a cleaning sleeve engaging a portion of the exterior of a radiation source assembly including a radiation source (e.g., a UV lamp). The cleaning sleeve is movable between: (i) a retracted position wherein a first portion of radiation source assembly is exposed to a flow of fluid to be treated, and (ii) an extended position wherein the first portion of the radiation source assembly is completely or partially covered by the cleaning sleeve. The cleaning sleeve includes a chamber in contact with the first portion of the radiation source assembly. The chamber is supplied with a cleaning solution suitable for removing undesired materials from the first portion of the radiation source assembly.

The cleaning system described in the Maarschalkerweerd #2 Patents represents a significant advance in the art, especially when implemented in the radiation source module and fluid treatment system illustrated in these patents. However, implementation of the illustrated cleaning system in a fluid treatment module such as the one illustrated in the Maarschalkerweerd #1 Patents is problematic.

The reason for this is that the specific system illustrated in the Maarschalkerweerd #2 Patents is based a conventional rod/cylinder design (see especially FIG. 6 and the accompanying text in the Maarschalkerweerd #2 Patents). Specifically, the cleaning rings (308) are connected to a rod (328) disposed in a cylinder (312,314). In use the rod (328) is extended from or retracted into the cylinder (312,314) thereby moving the cleaning rings (308) over the quartz sleeve surrounding the ultraviolet lamp. Thus, when the rod (328) is extended to its extreme stroke end from the cylinder (312,314), the overall length of the rod and the cylinder is approximately twice as long as the rod stroke. While this approach dovetails nicely with the radiation source module and fluid treatment system illustrated in the Maarschalkerweerd #2 Patents, it is difficult to implement the fluid treatment module illustrated in the Maarschalkerweerd #1 Patents since, in the latter Patents, the lamp is supported at both ends by an opposed pair of legs. In such a case, the distance between the opposed pair of legs would have to be doubled to allow for provision of a conventional rod/cylinder design where a single wiper is used. This becomes impractical since a preferred embodiment of the module illustrated in the Maarschalkerweerd #1 Patents involves using a low pressure, ultraviolet radiation lamp which can be up to be about five feet in length to provide the necessary wattage of radiation. This mitigates against doubling the distance between the pair of opposed legs used to support the lamps.

Accordingly, there remains a need in the art for a cleaning apparatus which obviates or mitigates at least one of the above-mentioned disadvantages of the prior art. More, specifically, it would be desirable to have such a cleaning system which is particularly well suited for implementation on a fluid treatment module such as the one illustrated in the Maarschalkerweerd #1 Patents.

SUMMARY OF THE INVENTION

It is an object of the invention to provide a cleaning system which obviates or mitigates at least one of the above-mentioned disadvantages of the prior art.

Accordingly, in one of its aspects, the present invention provides a cleaning apparatus for a radiation source assembly in a fluid treatment system, the cleaning system comprising:

a cleaning sleeve comprising a cleaning ring for engagement with a portion of the exterior of the radiation source assembly;

a slidable member magnetically coupled to the cleaning sleeve, the slidable member being disposed on and slidable with respect to a rodless cylinder; and motive means to translate the slidable member along the rodless cylinder whereby the cleaning sleeve is translated over the exterior of the radiation source assembly.

In another of its aspects, the present invention provides, a radiation source module for use in a fluid treatment system, the module comprising:

a frame having a first support member;

at least one radiation source assembly extending from and in sealing engagement with the first support member, the at least one radiation source assembly comprising a radiation source;

cleaning means to remove undesired materials from an exterior of the at least one radiation source assembly, the cleaning means comprising: a cleaning sleeve comprising a cleaning ring for engagement with a portion of the exterior of the radiation source assembly; a slidable member magnetically coupled to the cleaning sleeve, the slidable member being disposed on and slidable with respect to a rodless cylinder; and motive means to translate the slidable member along the rodless cylinder whereby the cleaning sleeve is translated over the exterior of the radiation source assembly;

means to position the radiation source module in the fluid treatment system.

Thus, the present cleaning apparatus and radiation source module of the present invention both utilize a rodless cylinder having magnetically coupled thereto a slidable member. As used throughout this specification, the terms "rodless cylinder" is intended to mean a cylinder having overall length which is less than twice the maximum stroke length of the slidable member thereon. Preferably, the rodless cylinder has an overall length which is substantially the same as the maximum stroke length of the slidable member thereon. In other words, inter alia, the term "rodless cylinder" effectively excludes the conventional rod/cylinder arrangements illustrated in the Maarschalkerweerd #2 Patents discussed herein above. As used throughout this specification, the term "magnetically coupled" is intended to encompass a two or more objects fixed with respect to one another through the exchange of magnetic energy—i.e., rather than through a direct physical connection or an indirect interaction of another kind.

BRIEF DESCRIPTION OF THE DRAWINGS

Embodiments of the present invention will be described with reference to the accompanying drawings, in which:

FIG. 4 is a side elevation of a first embodiment of the present radiation source module;

FIG. 5 is an end elevation of the radiation source module illustrated in FIG. 4;

FIG. 7 is a side elevation of a second embodiment of the present radiation source module;

FIG. 8 is an end elevation of the radiation source module illustrated in FIG. 7;

FIG. 12 is a perspective view of various of the elements illustrated in FIG. 11.

DETAILED DESCRIPTION OF THE PREFERRED EMBODIMENTS

Figure 1:
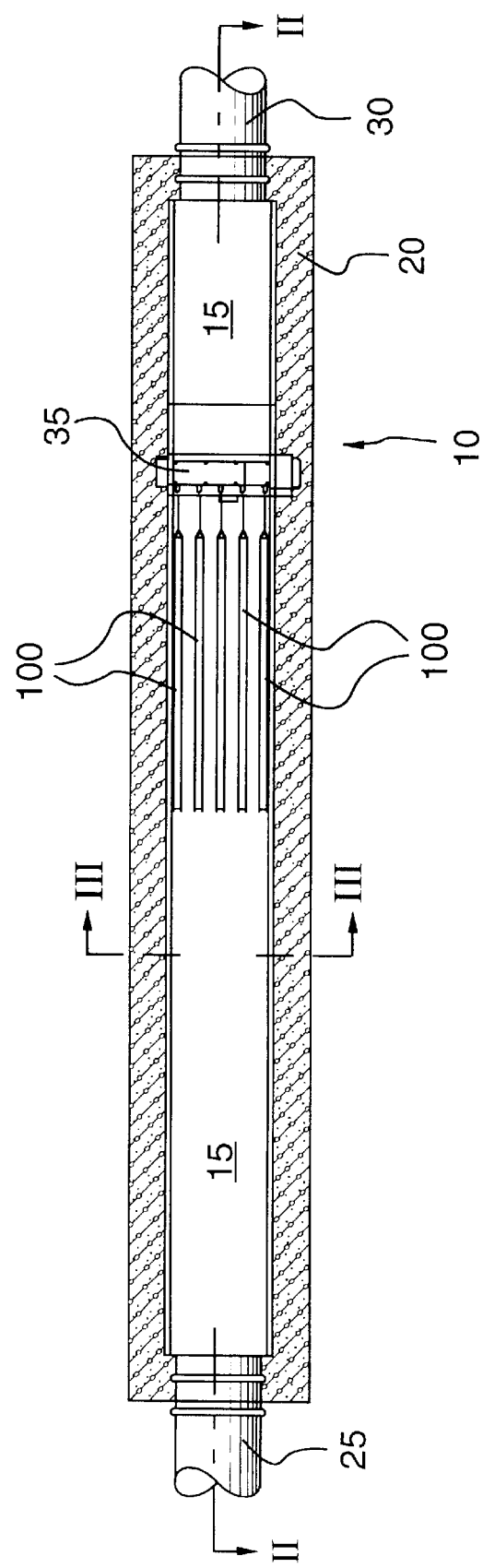
FIG. 1 is a top view of fluid treatment system incorporating the present radiation source module.
Figure 2:
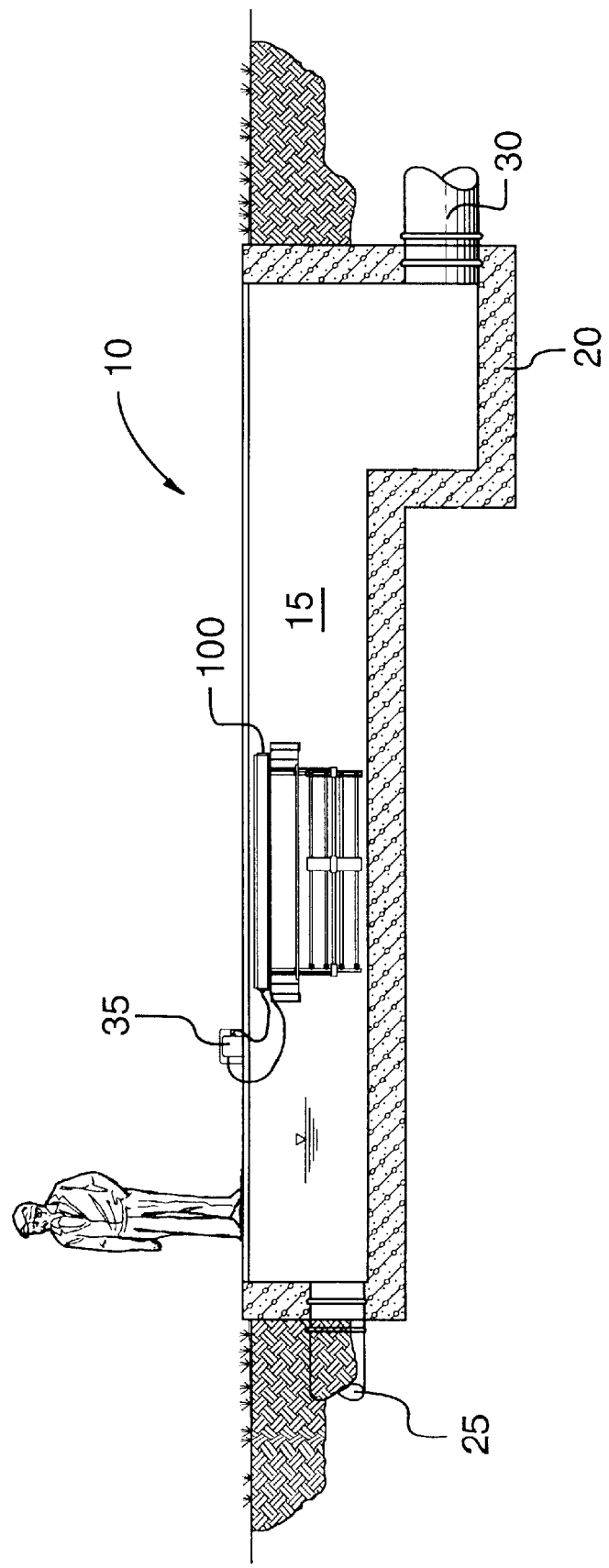
FIG. 2 is a sectional view taken along line II—II in FIG. 1.
Figure 3:
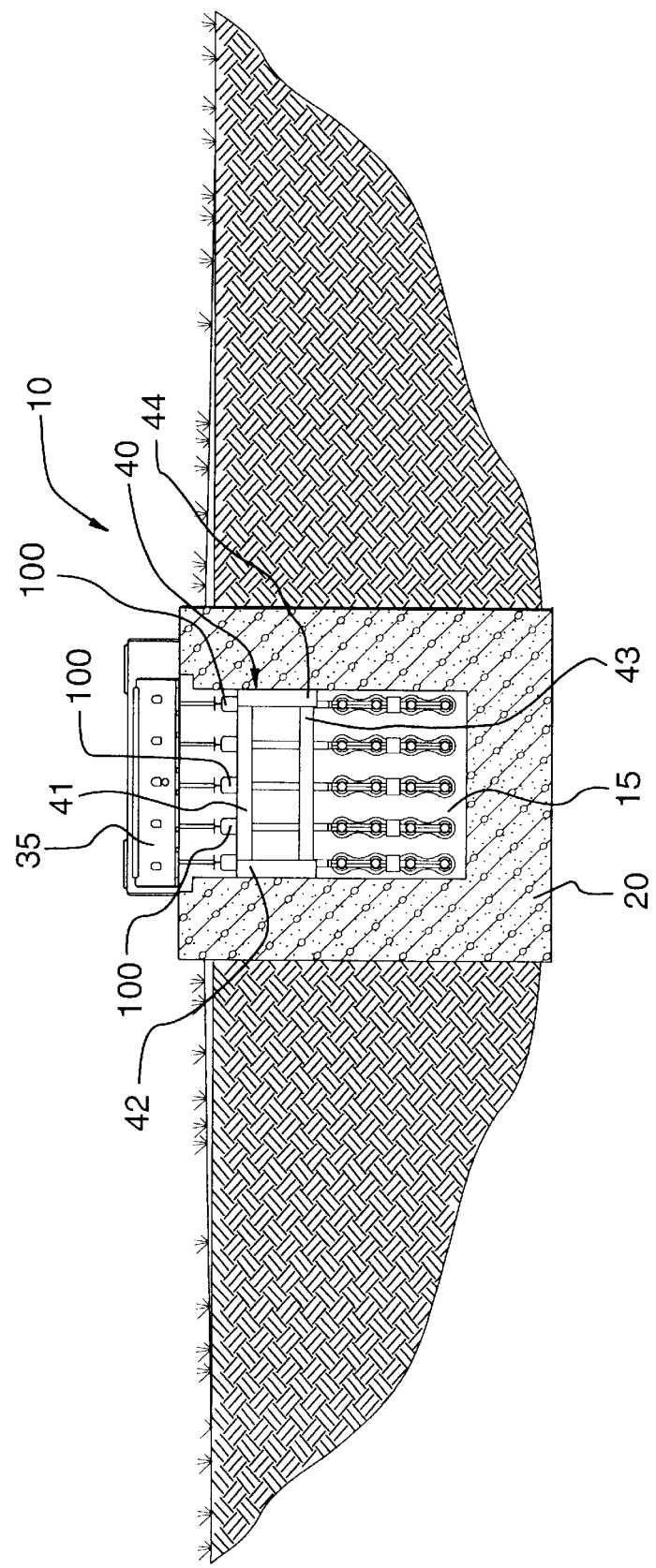
FIG. 3 is a sectional view taken along line III—III in FIG. 1.

With reference to FIGS. 1–3, there is illustrated a fluid treatment system 10. Fluid treatment system 10 comprises a channel 15 constructed of concrete 20. Channel 15 has an inlet 25 and an outlet 30 for receiving a flow of fluid (not shown).

Disposed in channel 15 is a plurality of radiation source modules 100. Each radiation source module 100 is connected to an electrical power supply 35 by an electrical lead 135.

As will be appreciated by those with skill in the art, fluid treatment system 10 illustrated in FIGS. 1–3 is a schematic only and has been greatly simplified to illustrate the arrangement of radiation source modules 100. As illustrated, it is preferred that radiation source modules 100 be arranged such that the elongated portions thereof are substantially parallel to the flow of fluid.

With particular reference to FIG. 3, a cradle 40 comprised of supports 41,42,43,44 is disposed in channel 15. As illustrated, support members 41,43 of cradle 40 are arranged transverse to the fluid flow in channel 15. Further, support members 42,44 are affixed to the sides of channel 15. Those with skill in the art will recognize that, in the illustrated embodiment, fluid treatment system 10 is designed such that the flow of fluid does not rise significantly above support member 43 of cradle 40.

The operation of fluid treatment system 10 is conventional and within the purview of a person skilled in the art. See, for example, the Maarschalkerweerd #1 Patents discussed herein above, the contents of which have been incorporated by reference hereinabove.

Figure 6:
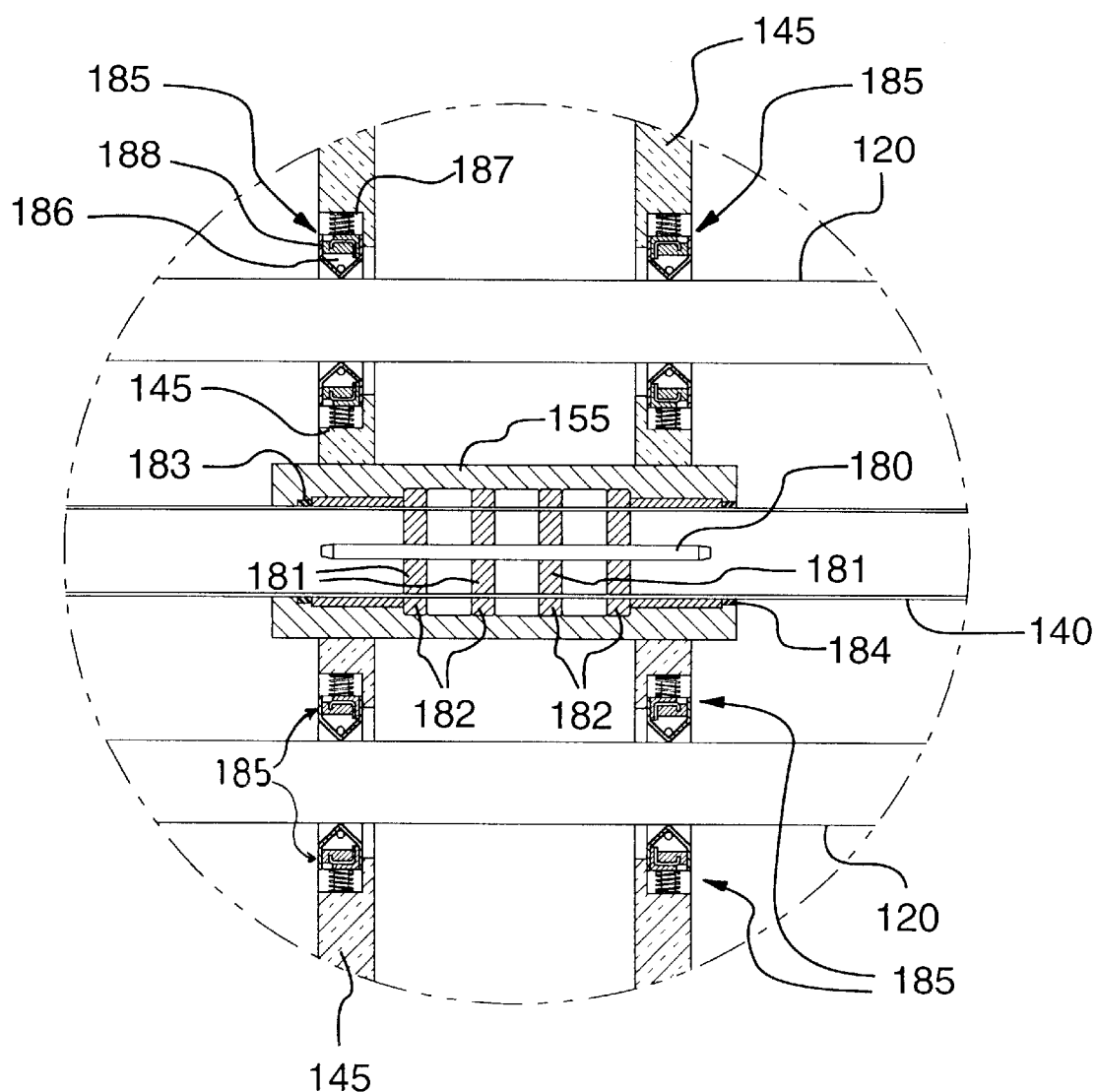
FIG. 6 is an enlarged sectional view taken along line VI—VI in FIG. 5.
Figure 9:
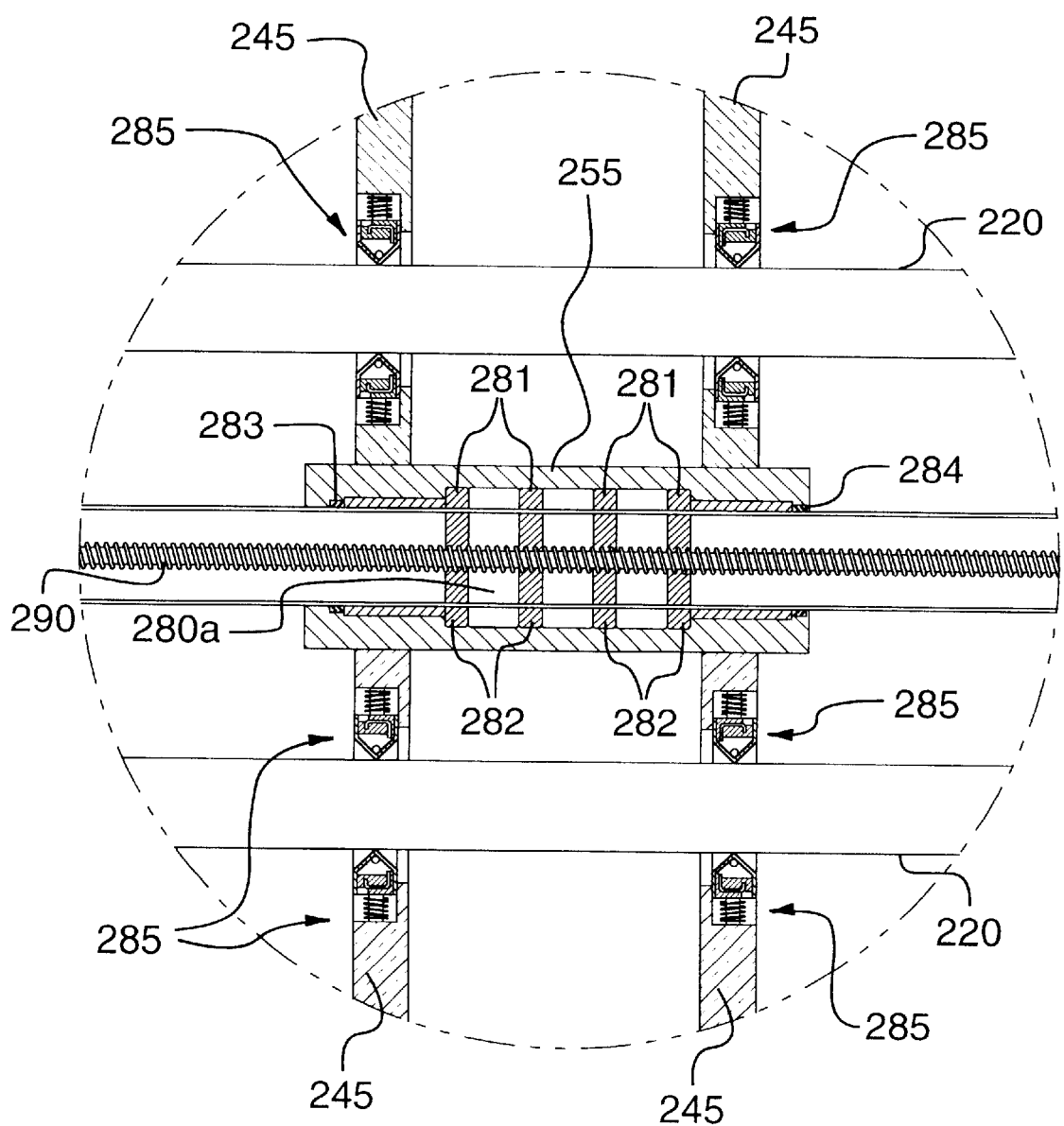
FIG. 9 is an enlarged sectional view taken along line IX—IX in FIG. 8.
Figure 10:
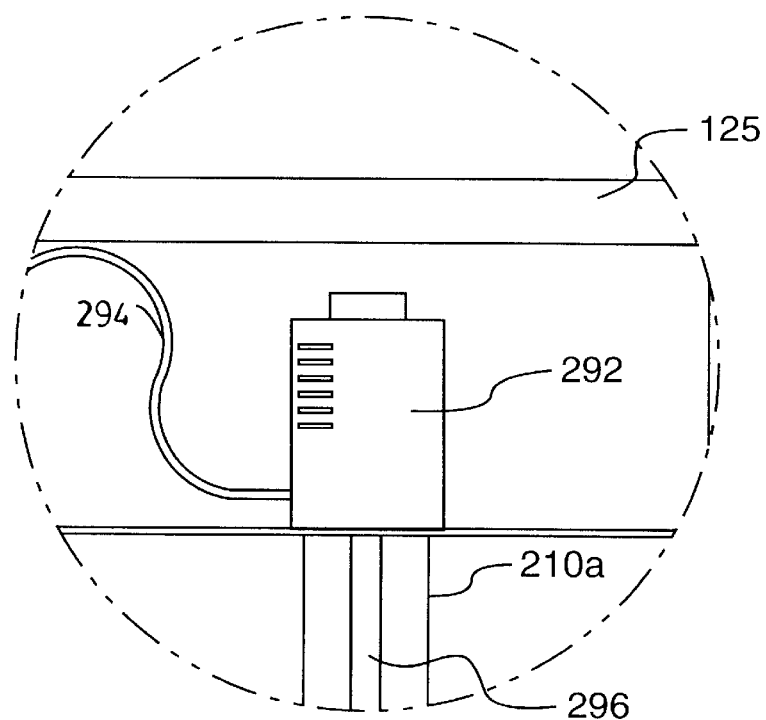
FIG. 10 is an enlarged sectional view taken along line X—X in FIG. 8.

With reference to FIGS. 4–6, radiation source module 100 will now be described in more detail. Thus, radiation source module 100 comprises a pair of support legs 105,110 depending from a cross piece 115. Disposed between support legs 105,110 are a series of radiation source assemblies 120. Preferably, the exterior of each radiation source assembly 120 comprises a protective sleeve, more preferably made of quartz. The design of support legs 105,110 and radiation source assemblies 120 is preferably as is described in U.S. Pat. Nos. 4,872,980 and 5,006,244 referred to and incorporated by reference hereinabove. Most preferably, it is preferred to design support leg 105 and/or support leg 110 to include a stop or similar means to avoid movement of the radiation source assemblies 120 during actuation of the present clean system.

Figure 11:
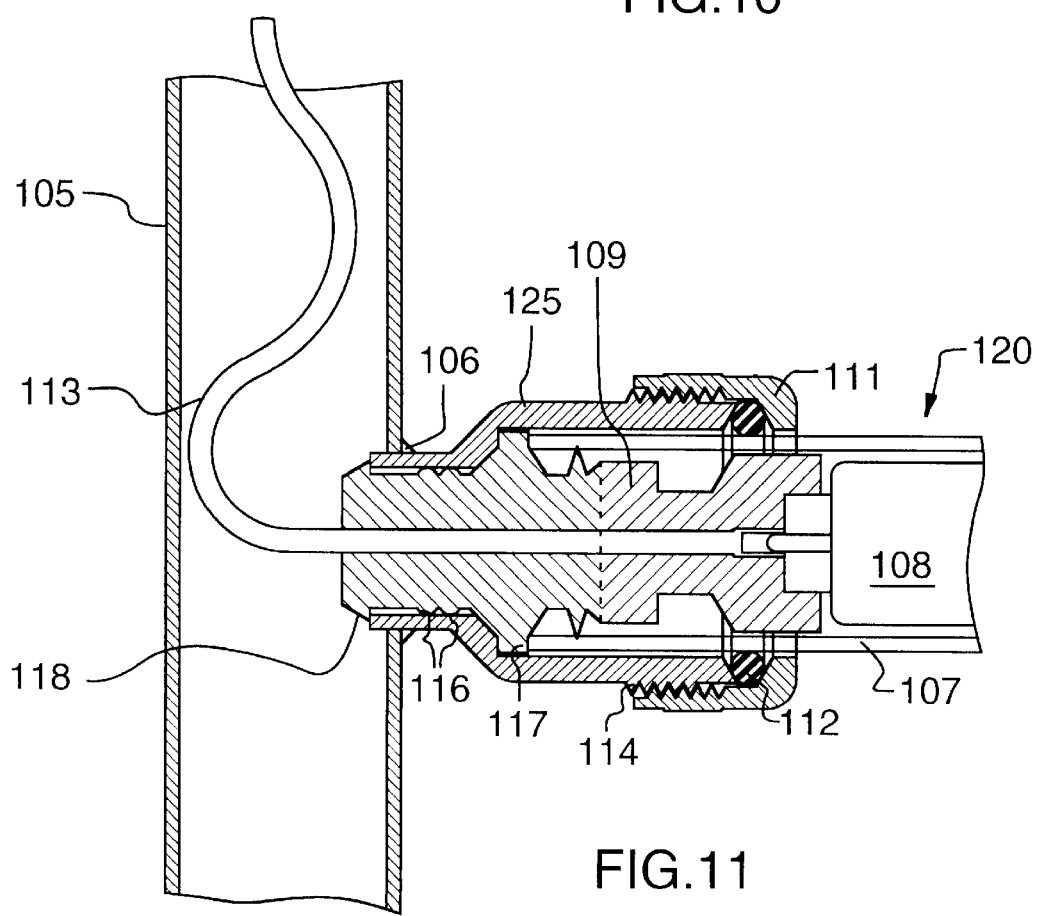
FIG. 11 is an enlarged sectional view of connection of the radiation source assembly to the support leg in a preferred embodiment of the present radiation source module.

With reference to FIGS. 11 and 12, further detail is provided on radiation source assembly 120, coupling socket 125 and support leg 105. Thus, coupling socket 125 is welded to support leg 105 via a bead 106. Coupling socket 125 receives a quartz sleeve 107 having disposed therein a radiation (preferably ultraviolet radiation) lamp 108. Coupling socket 125 also receives a connection member 109. A sleeve nut 111 is in threaded engagement with coupling socket 125 which serves to squeeze an O-ring 112 against quartz sleeve 107.

As shown, connection member 109 serves a number of purposes. First, it serves the purpose of connecting radiation lamp 108 to an electrical lead 113 which is fed to the ballast incorporated in cross-piece 115 or located remotely from radiation source module 100. Second, connection member 109 is provided with a first sealing lip 114 and a pair of second sealing lips 116. First sealing lip 114 serves to prevent water from entering support leg 105 (e.g., in the event that quartz sleeve 107 breaks). Lips 116 prevent water which may have leaked into support leg 105 from entering into radiation source assembly 120. Third, connection member 109 contains a stop 117 against which the open end of quartz sleeve 107 abuts thereby avoiding quartz sleeve 107 being damage on contact with metal coupling socket 125. Fourth, connection member 109 contains a lip 118 of slightly larger diameter than the internal diameter of the opening of coupling socket 125 disposed in support leg 105. Lip 118 serves to affix connection member 109 in the correct position.

In a preferred embodiment of the connection scheme illustrated in FIGS. 11 and 12, a surface grounding lead is provided (as a part of connection member 109) with one end connected to the inside of support leg 105 and the other end on the lamp side of first sealing lip 114 (e.g., in the lamp pin receptacle of connection member 109, in the space between connection member 109 and quartz sleeve 107, etc.) As will be appreciated by those of skill in the such an arrangement will allow for ground fault detection and automatic shutdown of the module (e.g., via a conventional Ground Fault Interrupt switch) in the event of breakage of quartz sleeve 107. The ground fault is used to detect water leakage.

Alternatively, the coupling of radiation source assemblies 120 to support leg 105 may be as described in U.S. Pat. Nos. 4,872,980 and 5,006,244. This includes a "triple seal system" which serves to seal radiation source module 100 from fluid ingress: (i) at the connection between radiation source assembly 120 and coupling socket 125, (ii) into radiation source assembly 120, and (iii) into support leg 105. The latter two functions are particularly preferred since they will protect flooding of all radiation source assemblies 120 in module 100 in the event that a single radiation source assembly 120 is broken while submerged.

Another preferred feature of radiation source assembly 100 is the provision, preferably in cross piece 115 of a ballast to control the radiation source in radiation source assemblies 120. Again, reference is made to previously mentioned and incorporated U.S. Pat. Nos. 4,872,980 and 5,006,244 for a more detailed description of provision of a ballast in radiation source module 100.

Also disposed between support legs 105,110 is a U-shaped member 130. As will be appreciated by those with skill in the art, when a series of radiation source modules 100 are aligned in a side-by-side arrangement, the corresponding side-by-side arrangement of U-shaped members 130 in each module 100 serves to provide at least a coarse shield from escape of radiation while the radiation source modules 100 are in use. With further reference to FIG. 4, an electrical lead 135 emanates from cross-piece 115. Preferably, electrical lead 135 is connect to a ballast in cross piece 115. Also connected to this ballast is electrical lead 113 which is fed through a hollow passage in support leg 105 as described in U.S. Pat. Nos. 4,872,980 and 5,006,244, mentioned above and incorporated by reference. If ballast is not incorporated in the module, electrical lead 113 is combined with other electrical leads from other radiation source assemblies 120 in a given module to form electrical lead 135 which is then connect to a ballast and supply of electricity remote to the module.

With further reference to FIG. 4, a rodless cylinder 140 is disposed between support legs 105,110. Disposed on rodless cylinder 140 is a cleaning sleeve 145. Cleaning sleeve 145 comprises a series of cleaning rings 150. Cleaning sleeve 145 is connected to a slidable member 155 which is in sliding engagement with rodless cylinder 140.

Rodless cylinder 140 is connected to a pair of connection blocks 160,165 disposed on support legs 105,110, respectively. A first fluid pressurization line 170 is connected to connection block 160 and a second fluid pressurization line 175 is connected to connection block 165. Fluid pressurization lines 170,175 are connected to a source of pressurized fluid (not shown). This may be a source of hydraulic pressure or pneumatic pressure. The connections to and from connection blocks 160,165 are preferably made substantially fluid-tight in a conventional manner which is within the purview of a person of ordinary skill in the art.

With particular reference to FIG. 6, a preferred form of rodless cylinder 140 is illustrated. Specifically, disposed with in rodless cylinder 140 is a piston 180. Piston 180 comprises a series of permanent magnets 181. Permanent magnets 181 are in fluid sealing engagement with the interior of rodless cylinder 140. Disposed within slidable member 155 is a series of annular permanent magnets 182 which are aligned with permanent magnets 181. Preferably, opposed pairs of individual permanent magnets 181 and individual annular permanent magnets 182 have different poles thereby creating an attraction between slidable member 155 and piston 180. A magnetically coupled rodless cylinder such as the one illustrated herein described in more detail in U.S. Pat. Nos. 3,779,401 [Carol], 4,488,477

[Miyamoto] and 4,744,287 [Miyamoto], the contents of which are hereby incorporated by reference.

Preferably, slidable member 155 is in a fluid sealing engagement with rodless cylinder 140. This can be achieved in any suitable manner way. For example, a pair of annular seals 183,184 may be provided between slidable member 155 and rodless cylinder 140. The seal may be achieved by using an interference fit between slidable member 155 and rodless cylinder 140, the magnetic forces created by the coupling of slidable member 155 to piston 180 or a combination of these. The advantage of providing such a seal between slidable member 155 and rodless cylinder 140 is that the exposed surface of rodless cylinder 140 is wiped during operation thereby keeping it relatively clean to avoid jamming of the cleaning system.

With continued reference to FIG. 6, cleaning sleeve 145 is a sealing engagement with the exterior of each radiation sources assembly 120 via a seal system 185. Seal system 185 comprises a V-shaped seal 186 which is biased against the exterior surface of radiation source assembly 120 by a biasing member 187 (e.g., a spring, an expandable bladder and the like). In the illustrated embodiment, a backing plate 188 is disposed between biasing member 187 and seal 186.

In the illustrated embodiment, a pair of opposed seal systems 185 is provided for each radiation source assembly 120. This results in the formation of a relatively fluid impermeable chamber between opposed pairs of seals systems 185. This chamber may be filled with a cleaning solution (not shown), if desired. The nature of this cleaning solution is not particularly restricted provided care is taken that it is not so corrosive that components of the cleaning sleeve become damaged by contact with the cleaning solution.

Radiation source module 100 is used to treat wastewater in the manner described in the Maarschalkerweerd #1 Patents referred to herein above. After some period of use, the exterior of radiation source assemblies will become fouled with undesired materials such as organic matter (e.g., biofilm) and/or inorganic matter (e.g., scale). This can be readily determined from historical data gathered during operation of fluid treatment system 10. Once it is desired to remove the undesired materials from the exterior of radiation source assemblies 120, a pressurized fluid is admitted through line 170 into rodless cylinder 140 via connection block 160. This serves to urge and translate slidable member 155 along rodless cylinder 140 (which in turn is coupled to cleaning sleeve 145) toward support leg 110 until cleaning sleeve 145 is positioned adjacent connection block 165 as shown at A in FIG. 4. Thereafter, pressurized fluid is fed through fluid pressurization line 175 and connection block 165 to urge and translate slidable member 155 towards support leg 105 (in the illustrated embodiment, this is the "parked position" of slidable member 155). Thus, those with skill in the art will immediately recognize that slidable member 155 and cleaning sleeve 145 connected thereto operate to remove undesired materials from the exterior of radiation source assemblies 120 in a reciprocal manner. One of the key advantages of radiation source module 100 is that, once historical data on frequency of cleaning needed has been gathered, the cleaning operation can be substantially automated allowing for in situ cleaning of the exterior of radiation resources assemblies 120 without the need to remove modules and/or shut down fluid treatment system 10.

An additional benefit of rodless cylinder 140 is that it can obviate the need for a supplementary support between support legs 105,110—e.g., the one illustrated (11) in U.S. Pat. No. 4,482,809 referred hereinabove.

With reference to FIGS. 1–10, another embodiment of the present radiation source module is illustrated. For clarity, elements in FIGS. 7–10 which correspond to like elements in FIGS. 4–6 have the same last two digits with a different first digit. Thus, for example, whereas radiation source module 100 is illustrated in FIGS. 4–6, radiation source 200 is illustrated in FIGS. 7–10.

The principal difference between radiation source module 100 illustrated in FIGS. 4–6 and radiation source module 200 illustrated in FIGS. 7–10 is that, in the latter, piston 280a is engaged with a screw member 290. Screw member 290 is driven by a motor 292 (preferably a DC motor) disposed in cross-piece 215. An electrical lead 294 emanates from motor 292 and is connected to a source of electricity (not shown). Motor 292 drives a shaft 296 which is disposed in support leg 210a. Shaft 296 is engaged with screw member 290 by a conventional bevel gear (not shown) disposed in connection block 265a. Those of skill in the art will recognize that motor 292 is reversible so that rotation of screw member 290 may be reversed.

Radiation source module 200 illustrated in FIGS. 1–10 may be used in a manner similar to that discussed hereinabove for radiation source module 100 illustrated in FIGS. 4–6. Thus, once it is desired to remove the undesired materials from the exterior of radiation source assemblies 220, motor 292 is actuated thereby rotating screw member 290. This serves to urge and translate slidable member 255 along rodless cylinder 240 (which in turn is coupled to cleaning sleeve 245) toward support leg 205. Once slidable member 255 is adjacent to support leg 205, the drive of electric motor 292 is reversed thereby reversing rotation of screw member 290, and urging and translating slidable member 155 toward support leg 210a.

While the present invention has been described with reference to preferred and specifically illustrated embodiments, it will of course be understood by those of skill in the arts that various modifications to these preferred and illustrated embodiments may be made without the parting from the spirit and scope of the invention. For example, the particular manner of urging and translating the drive member within the rodless cylinder is not restricted. In this regard, the drive member could be urged and translated using a series of cables and pulleys connected to a drive block typically (but not necessarily) located above the water level (e.g., a cable could be connected to each end of the piston in the rodless cylinder and fed out of opposed ends of the rodless cylinder and routed to the drive block via a suitable arrangement of pulleys). Further, it is not necessary to have a pair of opposed, laterally spaced support legs. Specifically, it is possible to modify the specific illustrated embodiment of the present radiation source module to a "single legged" module such as the one described in the Maarschalkerweerd #2 Patents. Still further, it is possible to have a plurality of cleaning sleeves per module. Still further, it is possible to modify the specifically illustrated embodiment such that the cleaning sleeve comprises of single wiper in place of an annular chamber surrounding to exterior of the radiation source assembly and containing a cleaning fluid. Still further, it is possible to modify the illustrated radiation source module to include two parking locations for the cleaning sleeve located adjacent the respective support legs (i.e., in this case a single stroke of the rodless cylinder would be a cleaning cycle whereas, in the illustrated embodiment, a double stroke of the rodless cylinder would be a cleaning cycle). Still further, if the rodless cylinder is operated by fluid pressurization, it possible to modify the illustrated embodiment to include the fluid pressurization lines in the respective support legs of the module thereby obviating additional hydraulic head loss. Alternatively, the illustrated embodiment could be modified to include a hydraulically streamline shield disposed upstream of the upstream support leg of the module. Still further, it is possible to modify the illustrated embodiment to utilize a rodless cylinder having a single port connected to a fluid pressurization source. In this modification, the single port would act as both a fluid inlet and a fluid outlet. For example, in one stroke of the rodless cylinder, the single port could be used to admit pressurized fluid and, in the reverse stroke, the single port could be used to draw a vacuum or as an exhaust (e.g., by the use of a spring or other biasing member located inside the rodless cylinder at the end opposite to the single inlet). Other modifications will be readily apparent to those with skill in the art.

What is claimed is:

1. A cleaning apparatus for a radiation source assembly in a fluid treatment system, the cleaning apparatus comprising:
   a cleaning sleeve comprising a cleaning ring for engagement with a portion of the exterior of the radiation source assembly;
   a slidable member coupled to the cleaning sleeve, the slidable member being disposed on and slidable with respect to a rodless cylinder, said rodless cylinder having an overall length which is less than twice a maximum stroke length of said slidable member;
   motive means to translate the slidable member along the rodless cylinder whereby the cleaning sleeve is translated over the exterior of the radiation source assembly; and
   a driving member disposed in said rodless cylinder and magnetically coupled to the slidable member, said driving member being axially slidable within the rodless cylinder.

2. The cleaning apparatus defined in claim 1, wherein the driving member comprises a plurality of driving magnets and the slidable member comprises a plurality of driven magnets.

3. The cleaning apparatus defined in claim 1, wherein the motive means comprises a fluid pressurization or a fluid vacuum source.

4. The cleaning apparatus defined in claim 3, wherein the fluid pressurization source or fluid vacuum source is connected to a first port which is in communication with the rodless cylinder, the first port acting alternately as a fluid inlet and fluid outlet.

5. The cleaning apparatus defined in claim 3, wherein the fluid pressurization source is connected to a first port and a second port which are in communication with the rodless cylinder.

6. The cleaning apparatus defined in claim 3, wherein the fluid pressurization source comprises a source of hydraulic pressure.

7. The cleaning apparatus defined in claim 3, wherein the fluid pressurization source comprises a source of pneumatic pressure.

8. The cleaning apparatus defined in claim 1, wherein the motive means comprises a mechanical drive disposed within the rodless cylinder.

9. The cleaning apparatus defined in claim 1, wherein the motive means comprises a mechanical drive connected to the driving member.

10. The cleaning apparatus defined in claim 9, wherein the motive means comprises a cable connected to the driving member, the cable further connected to a drive block.

11. The cleaning apparatus defined in claim 1, wherein the mechanical drive comprises a rotating member engaged with the driving member.

12. The cleaning apparatus defined in claim 1, wherein the rodless cylinder is submersible in a fluid to be treated.

13. The cleaning apparatus define in claim 1, wherein the cleaning sleeve comprises a plurality of cleaning rings.

14. The cleaning apparatus defined in claim 13, wherein the plurality of cleaning rings are arranged in parallel with respect to one another.

15. The cleaning apparatus defined in claim 1, wherein the cleaning sleeve comprises at least one pair of cleaning rings opposed with respect to the rodless cylinder.

16. The cleaning apparatus defined in claim 1, wherein the cleaning sleeve comprises a first plurality of cleaning rings and a second plurality of cleaning rings which are opposed with respect to the rodless cylinder.

17. The cleaning apparatus defined in claim 1, wherein the cleaning ring comprises a seal for sealing engagement with the portion of the exterior of the radiation source assembly, the seal removing a portion of undesired materials from the exterior of the radiation source assembly when the slidable member is translated along the rodless cylinder.

18. The cleaning apparatus defined in claim 1, wherein the cleaning ring comprises a chamber for surrounding a portion of the exterior of the radiation source assembly.

19. The cleaning apparatus defined in claim 18, wherein the cleaning sleeve further comprises an inlet for introduction of a cleaning solution to the chamber.

20. A radiation source module for use in a fluid treatment system, the module comprising:
   a frame having a first support member;
   at least one radiation source assembly extending from and in sealing engagement with the first support member, the at least one radiation source assembly comprising a radiation source;
   cleaning means to remove undesired materials from an exterior of the at least one radiation source assembly, the cleaning means comprising:
      a cleaning sleeve comprising a cleaning ring for engagement with a portion of the exterior of the radiation source assembly;
      a slidable member coupled to the cleaning sleeve, the slidable member being disposed on and slidable with respect to a rodless cylinder, said rodless cylinder having an overall length which is less than twice a maximum stroke length of said slidably member;
      motive means to translate the slidable member along the rodless cylinder whereby the cleaning sleeve is translated over the exterior of the radiation source assembly; and
      a driving member disposed in said rodless cylinder and magnetically coupled to the slidable member, said driving member being axially slidable within the rodless cylinder; and
   means to position the radiation source module in the fluid treatment system.

21. The radiation source module defined in claim 20, the frame further comprises a second support member opposed to and laterally spaced from the first support member, the at least one radiation source assembly disposed between each of the first support member and the second support member.

22. The radiation source module defined in claim 21, the frame further comprises a third support member interconnecting the first support member and the second support member.

23. The radiation source module defined in claim 20, wherein the frame further comprises a ballast for controlling the radiation source.

24. The radiation source module defined in claim 20, wherein the first support member comprises a hollow passageway for receiving a lead wire for conveying electricity to the radiation source.

25. The radiation source module defined in claim 20, wherein the radiation source assembly comprises a protective sleeve surrounding the radiation source.

26. The radiation source module defined in claim 25, wherein the protective sleeve comprises a quartz sleeve.

27. The radiation source module defined in claim 25, wherein the protective sleeve has an open end in sealed engagement with an opening in the first support member and a closed end supported by the second support member.

28. The radiation source module defined in claim 27, wherein the open end is sealed to prevent fluid ingress into the module.

29. The radiation source module defined in claim 20, wherein the driving member comprises a plurality of driving magnets and the slidable member comprises a plurality of driven magnets.

30. The radiation source module defined in claim 20, wherein the motive means comprises a fluid pressurization source.

31. The radiation source module defined in claim 30, wherein the fluid pressurization source is connected to a first port which is in communication with the rodless cylinder, the first port acting as both as a fluid inlet and fluid outlet.

32. The radiation source module defined in claim 30, wherein the fluid pressurization source is connected to a first port and a second port which are in communication with the rodless cylinder.

33. The radiation source module defined in claim 32, wherein the fluid pressurization source comprises a source of hydraulic pressure.

34. The radiation source module defined in claim 30, wherein the fluid pressurization source comprises a source of pneumatic pressure.

35. The radiation source module defined in claim 20, wherein the motive means comprises a mechanical drive disposed within the rodless cylinder.

36. The radiation source module defined in claim 20, wherein the motive means comprises a mechanical drive connected to the driving member.

37. The radiation source module defined in claim 36, wherein the motive means comprises a cable connected to the driving member, the cable further connected to a drive block.

38. The radiation source module defined in claim 20, wherein the mechanical drive comprises a screw member engaged with the driving member.

39. The radiation source module defined in claim 20, wherein the rodless cylinder is submersible in a fluid to be treated.

40. The radiation source module defined in claim 20, wherein the cleaning sleeve comprises a plurality of cleaning rings.

41. The radiation source module defined in claim 40, wherein the plurality of cleaning rings are arranged in parallel with respect to one another.

42. The radiation source module defined in claim 20, wherein the cleaning sleeve comprises at least one pair of cleaning rings opposed with respect to the rodless cylinder.

43. The radiation source module defined in claim 20, wherein the cleaning sleeve comprises a first plurality of cleaning rings and a second plurality of cleaning rings which are opposed with respect to the rodless cylinder.

44. The radiation source module defined in claim 20, wherein the cleaning ring comprises a seal for sealing engagement with the portion of the exterior of the radiation source assembly, the seal removing a portion of undesired materials from the exterior of the radiation source assembly when the slidable member is translated along the rodless cylinder.

45. The radiation source module defined in claim 20, wherein the cleaning ring comprises a chamber for surrounding the portion of the exterior of the radiation source assembly.

46. The radiation source module defined in claim 45, wherein the cleaning sleeve further comprises an inlet for introduction of a cleaning solution to the chamber.

47. A radiation source module for use in a fluid treatment system, the module comprising:
   a frame comprising a first support member, a second support member opposed to and laterally spaced from the first support member, and a third support member interconnecting the first support member and the second support member;
   a first radiation source assembly and a second radiation source assembly disposed between and supported by the first support member and the second support member, each radiation source assembly comprising a radiation source; and
   a cleaning device to remove undesired materials from an exterior of each radiation source assembly, the cleaning device comprising:
      a cleaning sleeve comprising a first cleaning ring for engagement with a portion of the exterior of the first radiation source assembly and a second cleaning ring for engagement with a portion of the exterior of the second radiation source assembly;
      a rodless cylinder disposed between the first support member and the second support member, the rodless cylinder having an interior chamber comprising a driving member which is slidable in the interior chamber and comprises a first set of magnets;
      a slidable member disposed on an exterior of the rodless cylinder and comprising a second set of magnets which are magnetically coupled to the first set of magnets, the slidable member being slidable over the exterior of the rodless cylinder between a first position substantially adjacent the first support member and a second position substantially adjacent the second support member; and
      motive means to translate the slidable member along the rodless cylinder whereby the cleaning sleeve is translated over the exterior of the radiation source assembly.

* * * * *